United States Patent [19]

Shukushima et al.

[11] Patent Number: 5,287,894
[45] Date of Patent: Feb. 22, 1994

[54] HEAT-SHRINKABLE FOAM TUBE AND METHOD OF MANUFACTURE

[75] Inventors: Satoshi Shukushima; Tomoyoshi Kishimoto, both of Osaka, Japan

[73] Assignee: Sumitomo Electric Industries, Ltd., Osaka, Japan

[21] Appl. No.: 831,054

[22] Filed: Feb. 4, 1992

[30] Foreign Application Priority Data

May 6, 1991 [JP] Japan .................... 3-196215

[51] Int. Cl.⁵ .................... B29C 67/22; C08J 9/10
[52] U.S. Cl. .................... 138/140; 521/87; 428/332
[58] Field of Search .................... 138/140; 264/22; 156/244.11; 428/332, 516; 521/89

[56] References Cited

U.S. PATENT DOCUMENTS

| | | |
|---|---|---|
| 4,049,147 | 9/1977 | Stiles et al. |
| 4,298,706 | 11/1981 | Ueno et al. ............ 264/45.3 |
| 4,373,554 | 2/1983 | Cook . |
| 4,911,979 | 3/1990 | Nishimoto et al. ......... 156/244.11 |
| 5,069,953 | 12/1991 | Kishikawa et al. ......... 156/227 |
| 5,071,886 | 12/1991 | Aoshima et al. .......... 264/54 |
| 5,089,352 | 2/1992 | Garland et al. ........... 264/22 |

FOREIGN PATENT DOCUMENTS

| | | |
|---|---|---|
| 1169622 | 2/1981 | Canada . |
| 200824 | 7/1985 | Fed. Rep. of Germany . |
| 233516 | 1/1987 | Fed. Rep. of Germany . |
| 412172 | 7/1989 | Fed. Rep. of Germany . |
| 52-114667 | 9/1977 | Japan . |
| 53-066986 | 6/1978 | Japan . |
| 53-152828 | 8/1984 | Japan . |

Primary Examiner—Harvey C. Hornsby
Assistant Examiner—Patrick F. Brinson
Attorney, Agent, or Firm—Cushman, Darby & Cushman

[57] ABSTRACT

A method of manufacturing a heat-shrinkable foam tube, wherein a two-layer tube, having a foaming agent outer layer and non-foaming inner layer, is extruded and heated simultaneously to activate the foaming agent. This process condenses the two steps of extruding and foaming into one step and results in a tube which can be manufactured to exact and consistent standards and be shrunk onto a pipe at a low temperature in a short period of time.

3 Claims, 1 Drawing Sheet

HEAT-SHRINKABLE FOAM TUBE AND METHOD OF MANUFACTURE

BACKGROUND OF THE INVENTION

The present invention relates to a method of manufacturing a heat-shrinkable foam tube for covering a pipe, rod, or the like, to provide heat-insulating, anti-corrosion, waterproofing, and other properties to the metal rod, or the like.

A heat-shrinkable foam tube has been conventionally used for purpose of heat insulating and heat retaining of metal pipes. Heat insulating a metal pipe can be realized, for example, by use of a heat-shrinkable foam tube made of a thermoplastic polymer having a foaming agent as disclosed in Japanese Patent Examined Publication No. Sho. 58-3819. There are basically four conventional methods of manufacturing heat-shrinkable foam tubes, all relating to when and how the foam is generated on the tube. The methods are: foaming after molding; foaming during extrusion; foaming after cross-linking; and foaming during shrinking.

In the foaming after molding method of manufacturing the tube, the foam is provided in advance and applied after the extrusion molding. However, this method requires the additional step of preparing the foam in advance and thereby raises the cost.

In the foaming during extrusion method, foaming is carried out at the time of extrusion, before cross-linking occurs. In the case of the shrinkable tube, however, if foaming is carried out at the time of extrusion, the inner pressure of the tube so varies that it is impossible to carry out stable extrusion foaming, resulting in large variations of the outside diameter of the tube. Generally, in order to make the outer diameter of the tube constant, the tube extrusion is carried out while a constant pressure is applied to the inside of the tube. However, if the extrusion is carried out with foaming agent in the tube, a pressure due to a foaming gas of the foaming agent is exerted inside of the tube, so that it becomes difficult to maintain constant pressure.

In the foaming after cross-linking method of manufacturing a heat-shrinkable foam tube, the foam is activated on the tube after being cross-linked. Therefore, the degree of cross-linking is maintained low to carry-out foaming. If the degree of cross-linking is too high, foaming cannot be carried out; however when cross-linking is low, thermal resistance decreases. Accordingly, the heat-resisting property of a tube manufactured by this method is not sufficient.

Another deficiency of this conventional method is that the outer diameter of the tube varies depending on the expansion ratio of the tube. Therefore, the outer diameter of the tube after shrinkage cannot be estimated while designing the tube.

In the foaming while shrinking method, the foam portion of the tube is formed at the time of the shrinking operation. Generating the foam involves heating the tube to a temperature not lower than about 180° C. for a considerable period of time in order to activate the foaming agent.

As described, the conventional methods of manufacturing heat-shrinkable foam tubes have the following deficiencies:

(a) if the foaming occurs after molding, extra steps are necessary, which increase the cost;

(b) if foaming occurs at the time of tube extrusion, it is impossible to extrude a tube with high dimensional precision.

(c) if foaming occurs after cross-linking, the heat-resisting property is insufficient; and (d) if foaming occurs at the time of shrinking, forming must be carried out at a high temperature for a long time.

In view of these deficiencies, the present method has been developed to manufacture heat-shrinkable foam tubes.

SUMMARY OF THE INVENTION

The method of manufacturing a heat-shrinkable foam tube according to the present invention is characterized by forming a tube having a two-layer structure comprising a foam layer as an outer layer and a non-foaming layer as an inner layer. The outer foam layer is foamed simultaneously with extrusion molding and is then cross-linked.

The present invention includes the following features as embodiments thereof:

(a) the non-foaming layer of the inner layer is made of a hot-melt adhesive agent; and (b) the expansion ratio is in a range of from 1.05 to 3.

DETAILED DESCRIPTION OF THE INVENTION

Figure 1:
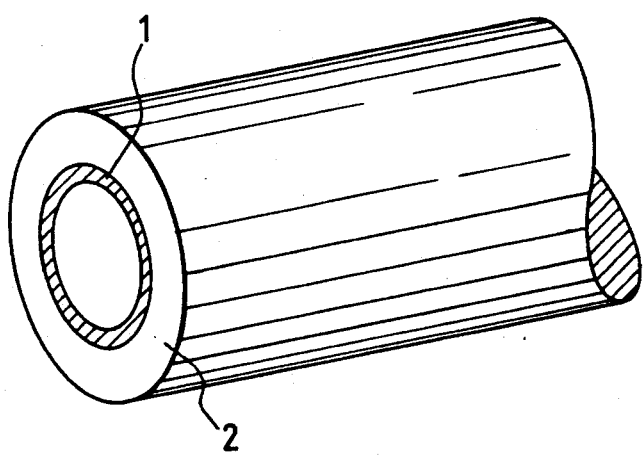
FIG. 1 is a cross-sectional view illustrating an embodiment of the present invention.

The present invention will be described using the example of an embodiment having a hot-melt adhesive-agent layer as the inner non-foam layer. See FIG. 1.

In order to solve the deficiencies of the prior art, a tube having a two-layer structure with a non-foaming, for example, hot-melt adhesive-agent, layer 1 provided on the inner layer and a foam layer including a foaming agent provided on the outer layer 2 is extruded by a two-layer extruder. During extrusion, the temperature of the outer layer is maintained at the foaming temperature of the foaming agent, and the temperature of the inner layer is maintained 10-20° C. higher than the melting point of the hot-melt adhesive agent, so that foaming is carried out at the time of extrusion. After the thus obtained tube is cross-linked, the tube is enlarged and expanded in the radial direction to form a heat-shrinkable tube having an adhesive layer.

In order to manufacture such a heat-shrinkable foam tube, first, a foam tube comprising a foam layer with a foaming agent, and an adhesive agent are simultaneously extruded by a two-layer extruder. If the temperature at which the foaming layer is extruded is equal to the foaming temperature of the foaming agent, foaming can be carried out at the time of extrusion. Further, since the inner hot-melt adhesive agent layer does not contain a foaming agent, no foaming occurs on the inner surface. Accordingly, the pressure inside the tube is not changed by foaming gas from the foaming agent. The inner layer provides a barrier so that the variation of inside pressure on the tube at the time of extrusion and foaming is suppressed and stable simultaneous foaming of the outer layer and extrusion can be carried out.

The outer diameter of a heat-shrinkable foam tube of the type in which foaming occurs at the time of shrinkage varies depending on the expansion ratio. Accordingly, the outer the tube is shrunk and foamed. However, the heat-shrinkable foam tube obtained by the present method is completely foamed at the time of extrusion, and the expansion ratio remains constant while the heat-shrinkable tube is shrunk. Accordingly, the outer diameter of the tube after shrinking can be estimated at the time of design.

Also, since the tube is subjected to cross-linking treatment after foaming is complete, the degree of cross-linking can be made high to obtain high heat-resistant properties.

In the above description, a hot-melt type adhesive agent is provided to the inner surface, by way of example, to bond to the metal pipe at the time of thermal shrinkage. Some examples of hot-melt adhesive agents are: EVA (copolymer of ethylene and vinyl-acetate), EEA (copolymer of ethylene and ethyl-acrylate), ionomer resin, polyamide resin, or the like.

The softening temperature of the hot-melt adhesive agent must be lower than the shrinkage temperature to ensure that the tube forms a water-proof seal with the metal pipe at the time of heat shrinkage.

A thermal plastic polymer is used as a base polymer of the foaming layer containing the foaming agent. For the thermal plastic polymer, it is possible to use polyethylene, ethylene-vinylacetate copolymer, ethylene-acrylate copolymer, ethylene-α olefin copolymer, polypropylene, polystyrene, poly(vinyl chloride), nitrile rubber, isobutylene-isoprene rubber, acrylonitrile-butadiene-styrene rubber, olefin elastomer, stylene elastomer, urethane elastomer, polyester elastomer, or the like.

Further, for the foaming agent to be mixed with the thermal plastic polymer, it is possible to use an azo compound such as azodicarbonamide, azobisisobutylonitrile or the like; a nitroso compound such as dinitrosopentamethylenetetramine or the like; a sulfonylhydrazide compound such as para-toluenesulfonyl-hydrazide, 4.4,'-oxybisbenzene sulfonylhydrazide, or the like.

In order to carry out foaming at the time of extrusion, the foaming agent should have an activation temperature equal to the extrusion temperature, or the extrusion temperature should be maintained equal to the foaming temperature of the foaming agent. Generally, the extrusion and the simultaneous foaming are carried out at 120°–160° C.

Further, in order to efficiently carry out foaming, a foaming auxiliary agent may be used together with the foaming agent. For example, as the foaming auxiliary agent, it is possible to use a urea compound, zinc white, tribasic sulfate, zinc stearate, lead stearate, or the like.

It is suitable that the quantity of foaming agent used is 0.5–20% by weight of the thermal plastic polymer. The quantity of foaming agent may be varied to obtain a necessary expansion ratio.

Further, in the foaming agent layer, if necessary, it is possible to add fillers such as talc, clay, silica, alumina, or the like; flame retardants such as deca-bromodiphenylether, antimony trioxide, magnesium carbonate, aluminum hydroxide, zinc borate, or the like; or antioxidants in the groups of phenol or amine.

According to the present invention, the heat-shrinkable foam tube is subjected to cross-linking treatment. For the, cross-linking treatment, it is possible to use a method of irradiation with ionizing radiation such as electron rays, gamma rays, or the like; or a method in which cross-linking is induced chemically. For chemical cross-linking, it is possible to use a peroxide such as a dicumyl peroxide, a lauryl peroxide, a benzoyl peroxide, a methylethyl ketone peroxide, or the like; a thiuram compound such as a tetramethylthiuram disulfide, a tetramethylthiuram monosulfide, or the like; a dithiocarbamate compound such as a zinc methyldithiocarbamate, a dithiocarbamate, or the like as the cross-linking agent. Generally, the amount of cross-linking agent used is about 0.2–4% by weight of the thermal plastic polymer.

According to the present invention, the diameter of the foam tube after cross-linking treatment is enlarged, while being heated at about 120°–160° C., until the inner diameter of the tube is greater than the outer diameter of an object to be covered. The enlarged tube is then cooled and solidified to thereby obtain the heat-shrinkable foam tube.

Although the tube having the two-layer structure of the inner adhesive-agent layer and the outer foaming-agent layer has been used as a specific example for the description of the present invention as described above, the inner layer is not always made of an adhesive agent but it may be made of any material so long as it has a not-foaming property.

Examples of embodiments of the present invention are now described to further explain the invention.

EXAMPLE 1

Polyethylene (MI:1.4) and a foaming agent (Trade name CELLMIC CAP-500, produced by Sankyo Chemical Industry Co.) in the group of azodicarbonamide were kneaded using a mixing roll and then made into pellets by using a pelletizer to thereby prepare an outer foaming layer material. The quantity of foaming agent was 1% by weight of the polyethylene.

EVA (MI:150, VA%:25) was used as an inner adhesive-layer material.

A foam tube with an adhesive agent, which has an inner diameter of 5 mm, an inner-layer thickness of 0.2 mm, and an outer-layer thickness of 1.2 mm, was formed through simultaneous extrusion by a two-layer extruder. The temperature at which the foam layer was extruded was selected to be 140° C. and the temperature at which the inner layer was extruded was selected to be 100° C. The foam layer was induced to expand at an expansion ratio of 1.5. The tube was stably extruded without changing its diameter during extruding.

Electron irradiation of 10 Mrad was applied to the tube by an electron accelerator so that polyethylene was cross-linked.

Next, the tube was passed through a furnace heated to 150° C., and a pressure was radially and outwardly exerted on the tube so that the inner diameter of the tube was increased to 10 mm.

This tube was made to cover a metal pipe having an outer diameter of 8 mm and was shrunk at 130° C. in five minutes. Thus, the shrinkable foam tube was shrunk at a low temperature in a short time (note that a tube of a type designed to foam while shrinking required 10 min at 180° C. to shrink).

During shrinking, the hot-melt adhesive agent of the inner layer was completely melted to form a waterproof layer on the surface of the metal pipe. The foam had an expansion ratio of 1.5, and the expansion ratio did not change during the shrinking stage. The outer diameter of the tube after shrinking was 10.2 mm, the same as the value estimated while designing the tube. Further, even after the tube was heated at 250° C. for ten minutes, the tube did not vary in shape or color and maintained good heat-resisting properties.

EXAMPLE 2

EVA (MI:1.5, VA%:10) and a sulfonyl hydrazide foaming agent (Trade name CELLMIC S, produced by Sankyo Chemical Industry Co.) were kneaded using a mixing roll and then made into pellets by using a pelletizer so as to be used as a material for the outer foaming layer. The quantity of the foaming agent was 2% by weight of the EVA.

Polyamide, having a softening point of 110° C., was used as a material for the adhesive layer.

A foam tube with an adhesive agent, which has an inner diameter of 10 mm, an inner-layer thickness of 0.3 mm, and an outer-layer thickness of 1.6 mm, was formed through simultaneous extrusion by a two-layer extruder. The temperature at which the foam layer was extruded was selected to be 140° C. and the temperature at which the inner layer was extruded was selected to be 110° C. The foam layer was induced to expand at an expansion ratio of 2. The tube was stably extruded without changing its diameter during extruding.

Electron irradiation of 10 Mrad was applied to the tube by an electron accelerator so that polyethylene was cross-linked.

Next, the tube was passed in a furnace heated to 150° C., and a pressure was radially and outwardly exerted on the tube so that the inner diameter of the tube was increased to 20 mm.

This tube was made to cover a metal pipe having an outer diameter of 15 mm and was shrunk at 130° C. for five minutes. Thus, the shrinkable foaming tube was shrunk at a low temperature in a short time.

During shrinking, the hot-melt adhesive agent of the inner layer was completely melted to thereby form a waterproof layer on the surface of the metal pipe. The foam had an expansion ratio of 2, and the expansion ratio did not change during shrinkage. The outer diameter of the tube was 18.1 mm, which was the same as the value estimated while designing the tube. Further, although the tube was heated at 250° C. for ten minutes, the tube did not vary in shape or color and maintained good heat-resistant properties.

In the method according to the present invention, foaming is carried out simultaneously with extruding the tube, so a separate foaming step is not required. Additionally, the foaming layer is previously formed so that it is unnecessary to carry out foaming while shrinking the tube, and shrinking can be carried out at a low temperature in a short time.

Also, the foaming step is completely carried out during extruding so that the expansion ratio of the foam does not vary during and after shrinking and therefore the outer diameter of the shrunk tube can be estimated while designing the tube. Further, since the cross-linking treatment is carried out after foaming and extrusion, the degree of cross-linking can be made high to increase heat-resisting property Of the tube.

By providing a non-foaming layer, for example, a hot-melt adhesive agent layer containing no foaming agent, on the inside of the foaming layer, the inner pressure of the tube remains constant during the process of simultaneous extruding and foaming, so that the tube can be extruded stably.

In the case where a hot-melt adhesive agent is provided on the inside of the foam layer, if the tube is shrunk on the metal pipe, the hot-melt adhesive agent on the inside of the foam layer is melted in the process of heat shrinking to thereby form a waterproof protecting layer. Accordingly, waterproof protection and heat insulation of a pipe can be simultaneously carried out in the shrinking process.

We claim:

1. A method of manufacturing a heat-shrinkable foam tube including the steps of:
   - forming a tube having two-layers comprising a foam layer with foaming agent as an outer layer and a non-foam layer as an inner layer;
   - extruding the tube while simultaneously activating and expanding the foam agent outer layer, thereafter
   - cross-linking the foam tube;
   - enlarging the diameter of the tube; and
   - cooling and solidifying the tube.

2. The method of claim 1, wherein the step of forming a tube having two layers includes the step of applying a hot-melt adhesive agent as the inside layer of the tube.

3. The method of claim 1 or 2, wherein the step of extruding the tube while activating and expanding the foam agent comprises expanding the foam outer layer having an expansion ratio of 1.05 to 3.

* * * * *